US012479286B2

(12) United States Patent
Okamoto (10) Patent No.: US 12,479,286 B2
(45) Date of Patent: Nov. 25, 2025

(54) TRANSAXLE FOR ELECTRIC VEHICLE

(71) Applicant: TOYOTA JIDOSHA KABUSHIKI KAISHA, Toyota (JP)

(72) Inventor: Shotaro Okamoto, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 596 days.

(21) Appl. No.: 17/897,713

(22) Filed: Aug. 29, 2022

(65) Prior Publication Data

US 2023/0120835 A1 Apr. 20, 2023

(30) Foreign Application Priority Data

Oct. 14, 2021 (JP) .................. 2021-168884

(51) Int. Cl.
*B60K 11/02* (2006.01)
*B60K 1/00* (2006.01)
*H02K 9/19* (2006.01)

(52) U.S. Cl.
CPC ............... *B60K 11/02* (2013.01); *B60K 1/00* (2013.01); *B60K 2001/001* (2013.01); *B60K 2001/006* (2013.01)

(58) Field of Classification Search
CPC .... B60K 11/02; B60K 1/00; B60K 2001/001; B60K 2001/003; B60K 2001/006; B60K 1/02; H02K 5/20; H02K 5/203; H02K 7/006; H02K 9/00; H02K 9/19; H02K 9/193; H02K 11/30; H02K 11/33; B60Y 2306/05; B60Y 2410/10

USPC ...................................... 310/54, 53
See application file for complete search history.

(56) References Cited

U.S. PATENT DOCUMENTS

| 6,201,365 | B1 * | 3/2001 | Hara | ......................... | B60L 1/02 |
| | | | | | 903/952 |
| 6,323,613 | B1 * | 11/2001 | Hara | ...................... | H02K 16/00 |
| | | | | | 903/952 |
| 7,800,260 | B2 * | 9/2010 | Komatsu | ................ | H02K 5/203 |
| | | | | | 180/65.1 |
| 7,851,954 | B2 * | 12/2010 | Endo | ..................... | B60W 20/00 |
| | | | | | 318/245 |

(Continued)

FOREIGN PATENT DOCUMENTS

| JP | 2007159314 A | * | 6/2007 |
| JP | 2009-51245 A | | 3/2009 |

(Continued)

OTHER PUBLICATIONS

JP 2007-159314 machine translation J-PlatPat [JPP] (Year: 2007).*

*Primary Examiner* — Alex W Mok
(74) *Attorney, Agent, or Firm* — Oblon, McClelland, Maier & Neustadt, L.L.P.

(57) ABSTRACT

A transaxle for an electric vehicle includes a motor, an inverter chamber, an oil chamber, and a cooling liquid chamber. The inverter chamber accommodates an electronic component configured to control the motor. The oil chamber is configured to store an oil that serves as a refrigerant. A cooling liquid that cools the electronic component flows through the cooling liquid chamber. The inverter chamber includes a wall also serving as a wall of the cooling liquid chamber. The oil chamber includes a wall also serving as a wall of the cooling liquid chamber.

6 Claims, 4 Drawing Sheets

(56) References Cited

U.S. PATENT DOCUMENTS

| | | | | |
|---|---|---|---|---|
| 8,080,909 B2* | 12/2011 | Perkins | ............... | H02K 9/197 |
| | | | | 310/59 |
| 2009/0206662 A1 | 8/2009 | Kakuda et al. | | |
| 2010/0194219 A1* | 8/2010 | Hotta | ................. | B60K 6/445 |
| | | | | 310/54 |
| 2010/0295391 A1* | 11/2010 | Perkins | ................. | B60K 6/48 |
| | | | | 903/906 |
| 2013/0301220 A1* | 11/2013 | Hotta | ................. | H02K 11/33 |
| | | | | 361/699 |
| 2021/0129660 A1* | 5/2021 | Bradfield | ........... | F16H 57/0465 |

FOREIGN PATENT DOCUMENTS

| | | |
|---|---|---|
| JP | 2019-140786 A | 8/2019 |
| JP | 2020-114087 A | 7/2020 |
| JP | 2021-35261 A | 3/2021 |

* cited by examiner

TRANSAXLE FOR ELECTRIC VEHICLE

BACKGROUND

1. Field

The following description relates to a transaxle for an electric vehicle.

2. Description of Related Art

Japanese Laid-Open Patent Publication No. 2020-114087 discloses a transaxle for an electric vehicle. The transaxle includes an oil-cooled cooling system and a water-cooled cooling system.

In the transaxle, the oil-cooled cooling system cools a motor. An oil-based coolant is circulated through the motor and an oil cooler (heat exchanger). When the coolant cools the motor, the coolant is increased in temperature. The coolant is sent to the oil cooler and cooled. Then, the coolant, which has been decreased in temperature, is sent to the motor to cool the motor.

The water-cooled cooling system cools a power converter disposed in a power converter case. The power converter in the power converter case is cooled with a radiator (heat exchanger) that is dedicated to the power converter. More specifically, a water-based coolant is circulated through the power converter case and the radiator, which is dedicated to the power converter, to cool the power converter. When the coolant cools the power converter, the coolant is increased in temperature. The coolant is sent to the radiator, which is dedicated to the power converter, and cooled. Then, the coolant, which has been decreased in temperature, is sent back to the power converter case to cool the power converter disposed in the power converter case.

In the above-described transaxle, the oil-cooled cooling system and the water-cooled cooling system are separate systems. Specifically, each cooling system includes a heat exchanger, an inlet pipe, and an outlet pipe. The heat exchanger uses the flow of air produced when the vehicle travels to release the heat of the coolant to the atmosphere. The inlet pipe and the outlet pipe connect the heat exchanger and a cooling subject. Accordingly, the cooling structure of the above-described transaxle includes a large number of parts and thus manufacturing costs are high.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a transaxle for an electric vehicle includes a motor, an inverter chamber, an oil chamber, and a cooling liquid chamber. The inverter chamber accommodates an electronic component configured to control the motor. The oil chamber is configured to store an oil that serves as a refrigerant. A cooling liquid that cools the electronic component flows through the cooling liquid chamber. The inverter chamber includes a wall also serving as a wall of the cooling liquid chamber. The oil chamber includes a wall also serving as a wall of the cooling liquid chamber.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

A transaxle for an electric vehicle in accordance with an embodiment will now be described with reference to the drawings.

Structure of Transaxle 20 for Electric Vehicle

Figure 1:
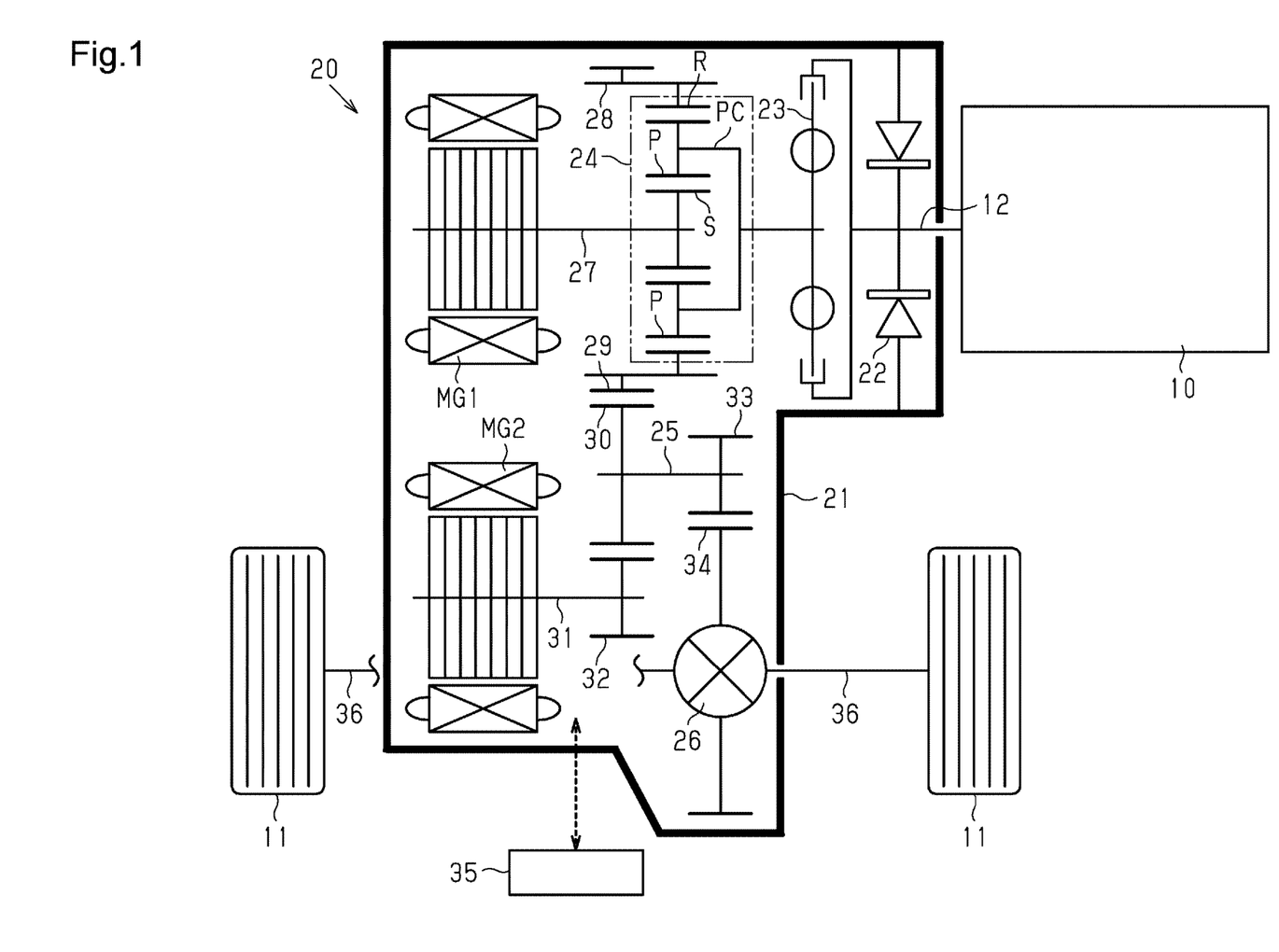
FIG. 1 is a schematic diagram of a transaxle for an electric vehicle in accordance with an embodiment.

A transaxle 20 for an electric vehicle will now be described with reference to FIG. 1. In an electric vehicle, the transaxle 20 is located between an engine 10 and left and right driving wheels 11. The driving force produced by the engine 10 and the transaxle 20 can be transmitted to the driving wheels 11. The transaxle 20 includes a transaxle case 21. The transaxle case 21 is installed in the electric vehicle in a state connected to the engine 10.

The transaxle case 21 accommodates a first motor-generator MG1 and a second motor-generator MG2. The first motor-generator MG1 and the second motor-generator MG2 combines the function of a motor, which produces driving force when supplied with electric power, and a generator, which generates electric power when supplied with driving force from an external device. Further, the transaxle case 21 accommodates a one-way clutch 22, a damper device 23, a planetary gear mechanism 24, a counter shaft 25, and a differential 26.

The planetary gear mechanism 24 includes three coaxial and rotatable rotary elements, namely, a sun gear S, a planetary carrier PC, and a ring gear R. The sun gear S is an external gear. The ring gear R is an internal gear and is disposed at the outer side of the sun gear S. The planetary carrier PC rotatably supports planetary gears P that are meshed with the sun gear S and the ring gear R. Among the rotary elements, the sun gear S is connected to a rotation shaft 27 of the first motor-generator MG1. The planetary carrier PC is connected to a crankshaft 12 of the engine 10 via the damper device 23 and the one-way clutch 22. The ring gear R is formed in the inner circumference of a cylindrical compound gear shaft 28. The compound gear shaft 28 includes an outer circumference forming a counter drive gear 29, which is an external gear.

The counter drive gear 29 meshes with a counter driven gear 30 arranged on the counter shaft 25. Further, the counter driven gear 30 meshes with a reduction gear 32 arranged on a rotation shaft 31 of the second motor-generator MG2.

A differential drive gear 33 is arranged on the counter shaft 25 and rotated integrally with the counter driven gear 30. The differential drive gear 33 meshes with a differential gear 34 of the differential 26. The differential 26 is a differential mechanism that allows differential rotation of the left and right driving wheels 11. The transaxle 20 is connected to the left and right driving wheels 11 via the differential 26 and two drive shafts 36.

Figure 2:
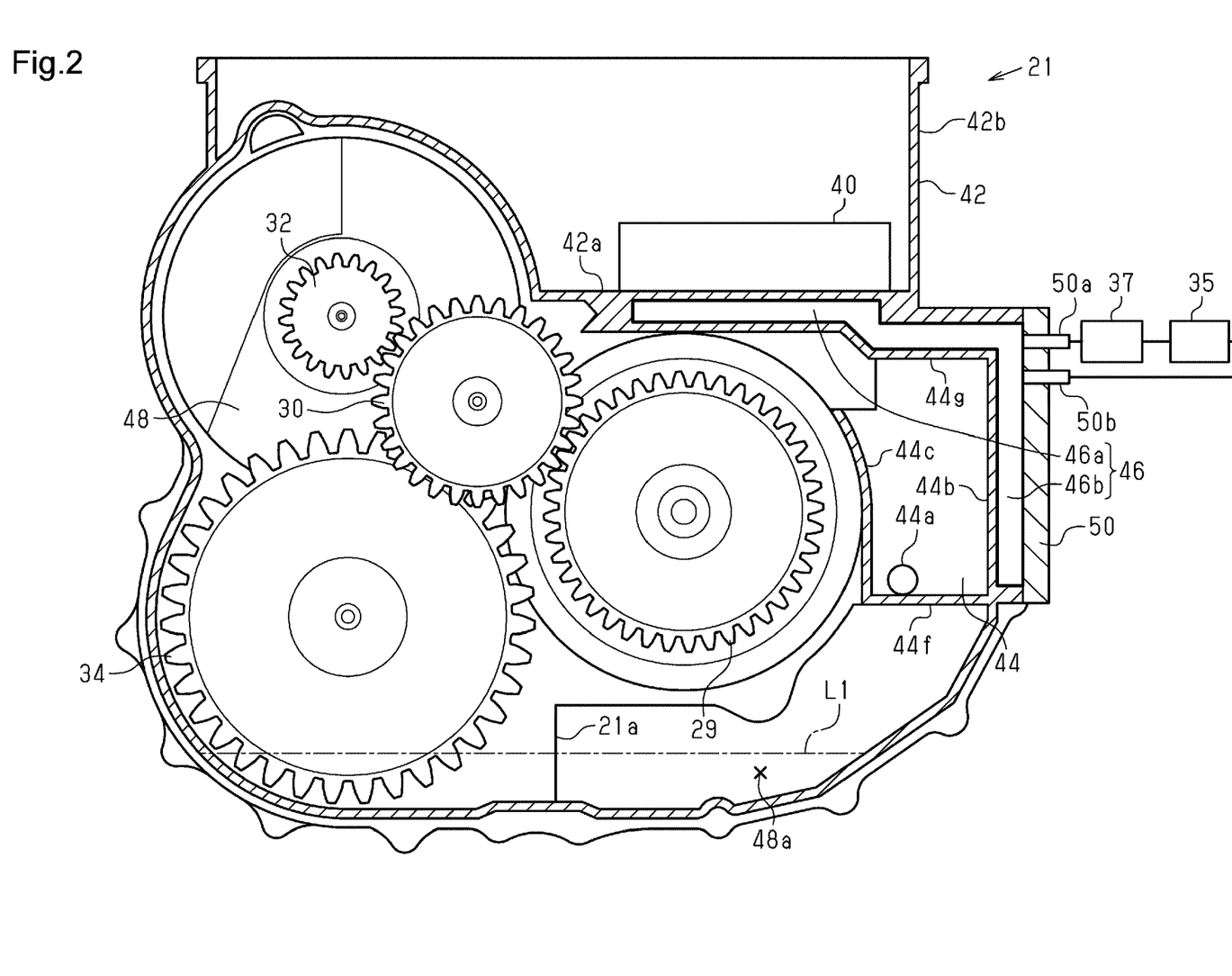
FIG. 2 is a cross-sectional view of a transaxle case showing a gear chamber, an oil catch tank, an inverter chamber, and a cooling liquid chamber in the transaxle of FIG. 1.
Figure 3:
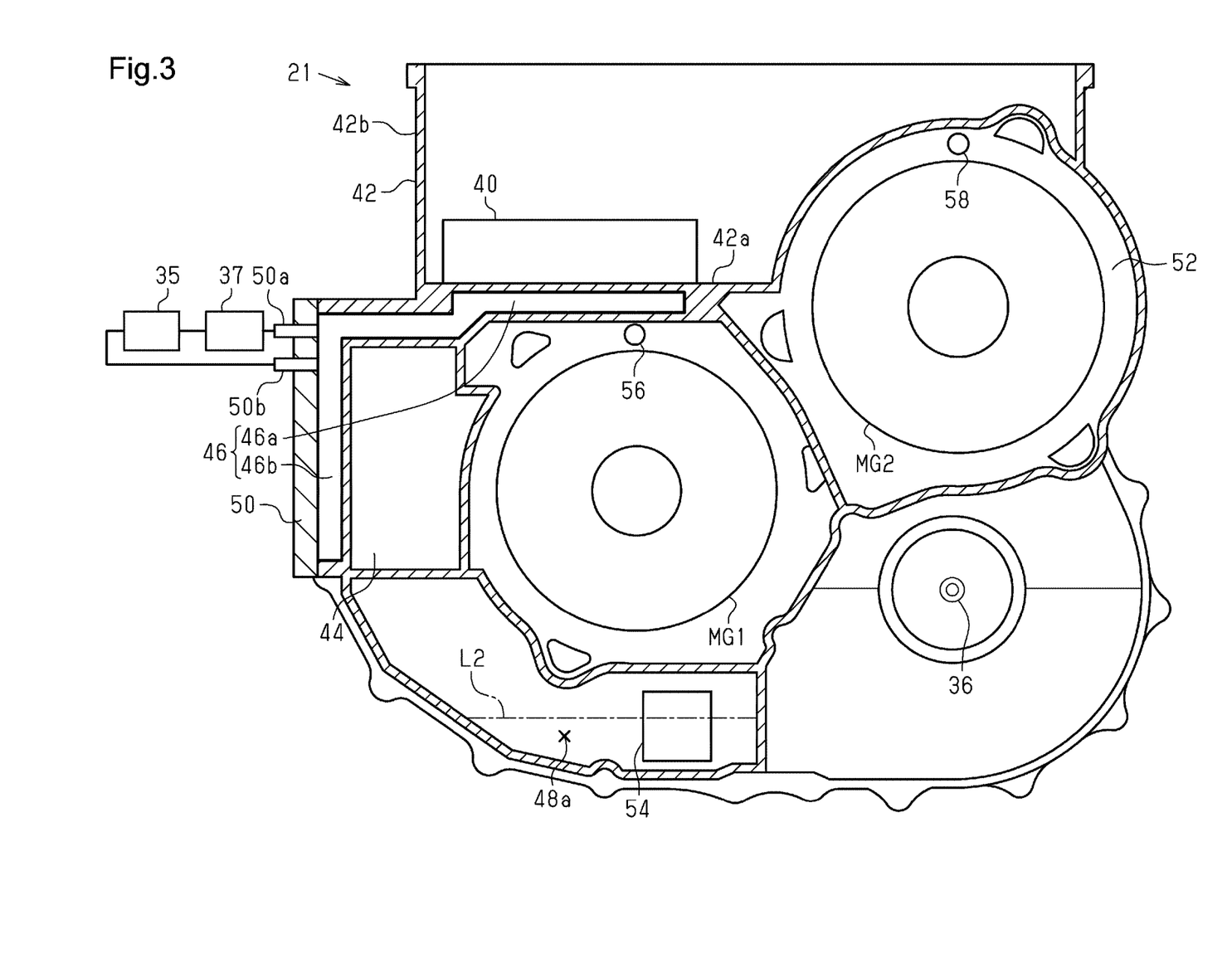
FIG. 3 is a cross-sectional view of the transaxle case showing a motor chamber, the oil catch tank, the inverter chamber, and the cooling liquid chamber in the transaxle of FIG. 1.
Figure 4:
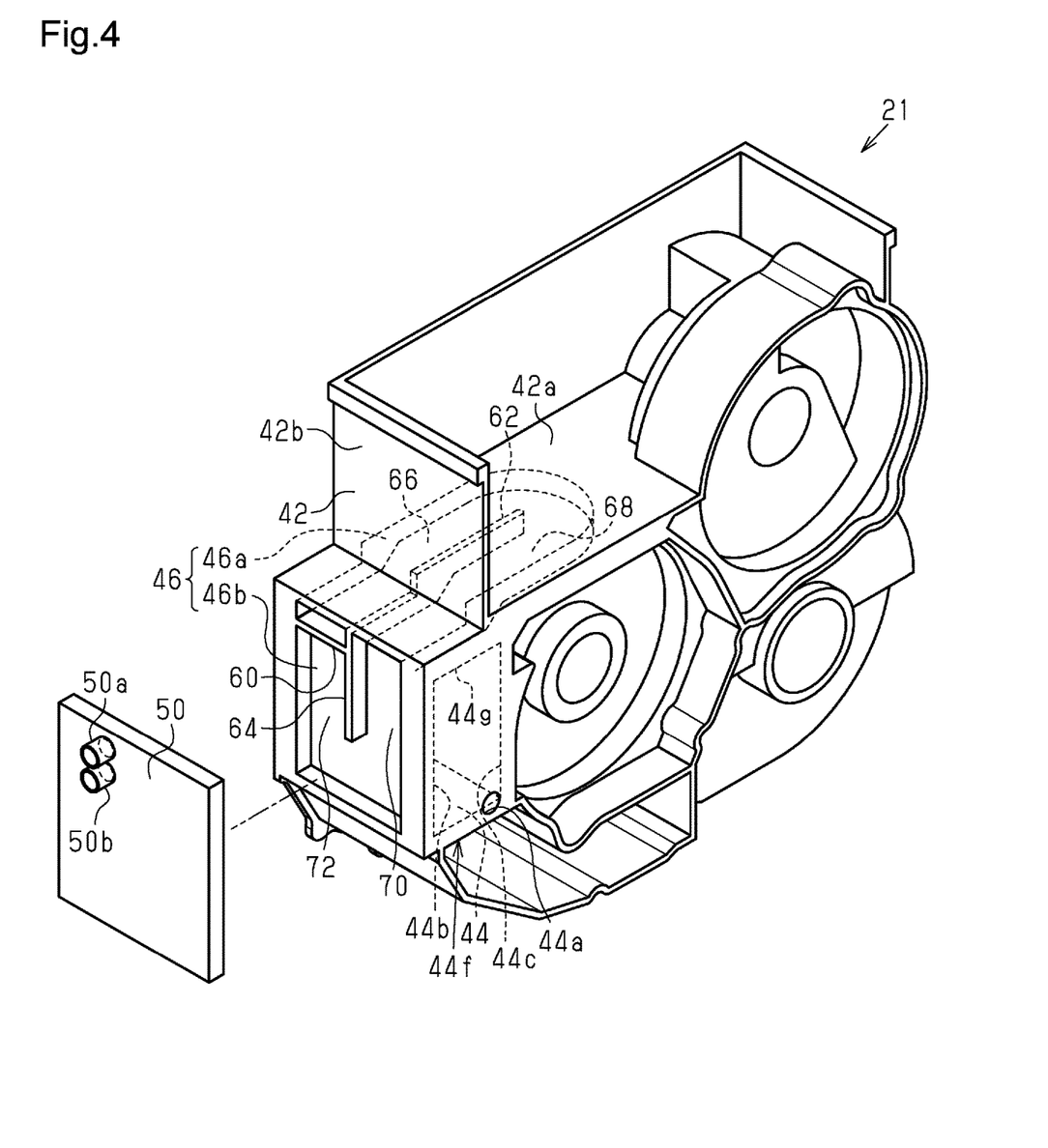
FIG. 4 is an exploded perspective view illustrating the cooling liquid chamber in the transaxle of FIG. 1 without an electronic component, a first motor-generator, and a second motor-generator.

As shown in FIGS. 2 to 4, the transaxle 20 includes an inverter chamber 42, an oil catch tank 44, a cooling liquid chamber 46, a gear chamber 48, and a motor chamber 52. These components will be described later in detail. Oil is enclosed in the transaxle case 21. As shown in FIG. 1, a heat exchanger 35 is mounted on the electric vehicle. The heat exchanger 35 exchanges heat with a cooling liquid flowing through the cooling liquid chamber 46 of the transaxle 20. In the present embodiment, the cooling liquid flowing through the cooling liquid chamber 46 is a coolant. The coolant is, for example, a long-life coolant (LLC).

Coolant in Transaxle Case 21

As shown in FIGS. 2 to 4, a cover 50 closes an open outer end of the transaxle case 21. As shown in FIG. 2, a partition wall 21*a* is arranged inside the transaxle case 21. The partition wall 21*a* partitions the gear chamber 48 from the motor chamber 52.

The transaxle 20 includes the inverter chamber 42 that accommodates an electronic component 40 configured to control the first motor-generator MG1 and the second motor-generator MG2. The electronic component 40 includes, for example, a DC/DC converter. The inverter chamber 42 is located in an upper part of the transaxle case 21. The inverter chamber 42 is located upward of the cover 50. The inverter chamber 42 includes a bottom wall 42*a* and a peripheral wall 42*b* extending upwardly from the bottom wall 42*a*. The inverter chamber 42 is adjacent to the second motor-generator MG2.

The transaxle 20 includes the cooling liquid chamber 46 through which the coolant flows to cool the electronic component 40. The cooling liquid chamber 46 includes a first liquid chamber 46*a* located directly below the inverter chamber 42. The bottom wall 42*a* of the inverter chamber 42 defines part of the first liquid chamber 46*a*. The first liquid chamber 46*a* extends from directly below the inverter chamber 42 toward the cover 50. A second liquid chamber 46*b* extends downwardly from the end of the first liquid chamber 46*a*. The cover 50 closes the open outer end of the transaxle case 21 to define the second liquid chamber 46*b*. In this manner, the cooling liquid chamber 46 includes the first liquid chamber 46*a* and the second liquid chamber 46*b* and is substantially L-shaped.

The transaxle 20 includes the oil catch tank 44 configured to store the oil that serves as a refrigerant. As shown in FIG. 4, the oil catch tank 44 includes a hole 44*a* used to drain oil. When the transaxle 20 is not operated, the oil catch tank 44 is emptied. The oil catch tank 44 is located directly below the first liquid chamber 46*a*. The second liquid chamber 46*b* is located between the oil catch tank 44 and the cover 50. The oil catch tank 44 is substantially box-shaped. More specifically, the oil catch tank 44 includes a side wall 44*b*, a side wall 44*c*, a bottom wall 44*f*, and an upper wall 44*g*. The oil catch tank 44 also includes a side wall, located near the motor chamber 52, connecting the side wall 44*b* and the side wall 44*c* and including the hole 44*a*, as shown in FIG. 4. The oil catch tank 44 further includes a side wall, located near the gear chamber 48, connecting the side wall 44*b* and the side wall 44*c* and facing the side wall that includes the hole 44*a*.

The upper wall 44*g* of the oil catch tank 44 defines part of the first liquid chamber 46*a*. The side wall 44*b* of the oil catch tank 44 defines part of the second liquid chamber 46*b*. The side wall 44*c* of the oil catch tank 44 faces the side wall 44*b* of the oil catch tank 44. The bottom wall 44*f* of the oil catch tank 44 faces the upper wall 44*g* and connects the side wall 44*b* and the side wall 44*c*.

As shown in FIG. 4, the bottom wall 42*a* is a wall of the inverter chamber 42 and also serves as a wall of the cooling liquid chamber 46. Thus, the coolant flowing through the cooling liquid chamber 46 cools the electronic component 40 accommodated in the inverter chamber 42 through the bottom wall 42*a*.

As shown in FIG. 4, the side wall 44*b* is a wall of the oil catch tank 44 and also serves as a wall of the cooling liquid chamber 46. Thus, the coolant flowing through the cooling liquid chamber 46 cools the oil in the oil catch tank 44 through the side wall 44*b*.

The cooling liquid chamber 46 will now be described in detail.

As shown in FIG. 4, the cooling liquid chamber 46 is defined by the transaxle case 21 and the cover 50. The cover 50 is coupled to the transaxle case 21 and forms a wall of the cooling liquid chamber 46. The cover 50 includes an inlet 50*a* and an outlet 50*b* for the cooling liquid. As shown in FIGS. 2 and 3, the inlet 50*a* is connected to a water pump 37 by a pipe. The water pump 37 is connected to the heat exchanger 35 by a pipe. The outlet 50*b* is connected to the heat exchanger 35 by a pipe. The water pump 37 is driven electrically. When the water pump 37 is driven, the coolant is sequentially circulated through the water pump 37, the cooling liquid chamber 46, and the heat exchanger 35.

The cooling liquid chamber 46 is substantially L-shaped and includes the first liquid chamber 46*a* and the second liquid chamber 46*b* extending from the end of the first liquid chamber 46*a*. The first liquid chamber 46*a* extends between the inverter chamber 42 and the oil catch tank 44. The second liquid chamber 46*b* is adjacent to the oil catch tank 44.

As shown in FIG. 4, the inlet 50*a* is located adjacent to the outlet 50*b*. The inlet 50*a* is arranged in an upper corner of the cover 50 proximate to the gear chamber 48. The outlet 50*b* is arranged below the inlet 50*a*. The portion where the coolant flows immediately after entering the cooling liquid chamber 46 through the inlet 50*a* is partitioned by a partition wall 60 from the portion where the coolant flows immediately before exiting the cooling liquid chamber 46 through the outlet 50*b*.

The first liquid chamber 46*a* includes a partition wall 62 that partitions the first liquid chamber 46*a* into a first flow passage 66 and a second flow passage 68. The second flow passage 68 extends back from the portion connected to the first flow passage 66 so that the coolant flows in a direction opposite to the direction in which the coolant flows in the first flow passage 66. The first flow passage 66 refers to a flow passage extending from the inlet 50a to directly below the electronic component 40. The second flow passage 68 refers to a flow passage extending from where the first flow passage 66 is directly below the electronic component 40 to the cover 50. The first flow passage 66 and the second flow passage 68 form a flow passage that is U-shaped as viewed from above the transaxle case 21. The first flow passage 66 and the second flow passage 68 are both located adjacent to the inverter chamber 42 at a side of the bottom wall 42a, which separates the inverter chamber 42 and the cooling liquid chamber 46, opposite to the inverter chamber.

The second liquid chamber 46b includes a partition wall 64 that partitions the second liquid chamber 46b into a third flow passage 70 and a fourth flow passage 72. The fourth flow passage 72 extends back from the portion connected to the third flow passage 70 so that the coolant flows in a direction opposite to the direction in which the coolant flows in the third flow passage 70. The partition wall 64 is arranged in the second liquid chamber 46b and extends from the side wall 44b to the cover 50. The partition wall 64 is connected to the partition wall 60 and the partition wall 62. The third flow passage 70 is connected to the second flow passage 68 and extends along the cover 50 to the bottom wall 44f of the oil catch tank 44. The fourth flow passage 72 is connected to the third flow passage 70 and extends from the bottom wall 44f of the oil catch tank 44 to the outlet 50b. The third flow passage 70 and the fourth flow passage 72 are both located adjacent to the oil catch tank 44 at a side of the side wall 44b, which separates the oil catch tank 44 and the cooling liquid chamber 46, opposite to the oil catch tank.

In this manner, the cooling liquid chamber 46 includes the partition wall 60 in an intermediate part of the flow passage to partition the start point and the end point of the flow passage looped by the partition walls 62 and 64.

The coolant flows into the cooling liquid chamber 46 through the inlet 50a arranged in the cover 50. After entering the cooling liquid chamber 46, the coolant sequentially flows through the first flow passage 66, the second flow passage 68, the third flow passage 70, and the fourth flow passage 72. Then, the coolant flows out of the cooling liquid chamber 46 through the outlet 50b arranged in the cover 50.

Oil in Transaxle Case 21

The oil in the transaxle case 21 is sequentially circulated through the gear chamber 48, the oil catch tank 44, and the motor chamber 52. The oil circulates within the transaxle case 21 and does not exit the transaxle case 21.

The gear chamber 48 shown in FIG. 2 accommodates the planetary gear mechanism 24, the counter drive gear 29, the counter driven gear 30, the reduction gear 32, the differential drive gear 33, and the differential gear 34. As the single-dashed line shown in FIG. 2 indicates, a liquid surface L1 of the oil is higher than the lower end of the differential gear 34. As described above, the differential gear 34 is connected to the first motor-generator MG1 via the differential drive gear 33, the counter driven gear 30, the counter drive gear 29, and the planetary gear mechanism 24. In other words, the differential gear 34 is indirectly connected to the first motor-generator MG1 and is at least partially immersed in the oil. Accordingly, when the differential gear 34 is driven, the oil is dispersed in the gear chamber 48. Therefore, the oil dispersed by the differential gear 34 lubricates, or cools the planetary gear mechanism 24, the counter drive gear 29, the counter driven gear 30, the reduction gear 32, the differential drive gear 33, and the differential gear 34. Bearings in the gear chamber 48 (not shown) are also lubricated, or cooled.

As shown in FIG. 2, the upper end of the side wall 44c in the gear chamber 48 does not extend to the upper wall 44g. Thus, the upper part of the oil catch tank 44 is open. Accordingly, the oil catch tank 44, which is open to the gear chamber 48, captures some of the oil dispersed when the differential gear 34 is driven. In other words, the oil catch tank 44 is configured to store the oil dispersed when the differential gear 34 rotates.

As shown in FIG. 2, the oil catch tank 44 is adjacent to the cooling liquid chamber 46 through which the coolant flows.

As shown in FIG. 4, the lower part of the oil catch tank 44 includes the hole 44a, which opens in the motor chamber 52. More specifically, the hole 44a that opens in the motor chamber 52 is arranged in the lower part of the side wall that is proximate to the motor chamber 52 and connects the side wall 44b and the side wall 44c. The oil cooled in the oil catch tank 44 flows through the hole 44a into the motor chamber 52.

In FIG. 3, the single-dashed line indicates a liquid surface L2 of the oil in the motor chamber 52. The transaxle 20 includes an oil pump 54 configured to pump the oil. Some of the oil in the motor chamber 52 is pumped by the oil pump 54 and guided through a flow passage (not shown) into an MG1 oil shower 56 and an MG2 oil shower 58. The MG1 oil shower 56 showers the first motor-generator MG1 with the oil pumped by the oil pump 54. The MG2 oil shower 58 showers the second motor-generator MG2 with the oil pumped by the oil pump 54. In this manner, the first motor-generator MG1 and the second motor-generator MG2 are cooled by oil.

As described above, the partition wall 21a divides the gear chamber 48 and the motor chamber 52. The partition wall 21a includes an opening 48a. The opening 48a connects the motor chamber 52 and the gear chamber 48. Accordingly, the oil that cooled the first motor-generator MG1 and the second motor-generator MG2 flows through the opening 48a into the gear chamber 48. Also, some of the oil in the motor chamber 52 flows through the opening 48a into the gear chamber 48 without cooling the first motor-generator MG1 and the second motor-generator MG2.

Operation of Present Embodiment

As described above with reference to FIG. 4, the side wall 44b is a wall of the oil catch tank 44 and also serves as a wall of the cooling liquid chamber 46. Thus, the oil in the oil catch tank 44 is cooled by the side wall 44b that is cooled by the coolant flowing through the cooling liquid chamber 46. The cooled oil flows through the hole 44a into the motor chamber 52. The cooled oil is mixed with the oil that was heated when cooling the first motor-generator MG1 and the second motor-generator MG2. This avoids excess increases in the oil temperature.

Advantages of Present Embodiment (1) The oil, which serves as a refrigerant, is cooled by the side wall 44b of the cooling liquid chamber 46, through which the cooling liquid that cools the electronic component 40 flows. This eliminates the need for an oil-dedicated heat exchanger that releases heat to the atmosphere from oil that is increased in temperature when cooling a cooling subject. Further, there is no need for an inlet pipe and an outlet pipe that connect a cooling subject of the oil and a heat exchanger dedicated to the oil. Therefore, the above structure reduces the manufacturing costs.

(2) The cooling liquid chamber 46 is arranged inside the transaxle case 21. This reduces the cooling system in size compared to when an oil-dedicated heat exchanger is arranged outside the transaxle case 21. This also improves the rigidity of the cooling system compared to when an inlet pipe and an output pipe connect the transaxle case 21 and an oil-dedicated heat exchanger arranged outside the transaxle case 21. Consequently, power plant resonance that occurs between the engine 10 and the transaxle 20 is limited and noise is reduced inside the passenger compartment.

(3) The partition wall 62 defines the flow passage and controls the flow of the cooling liquid inside the cooling liquid chamber 46. This allows the cooling liquid to cool the electronic component 40 effectively.

(4) The partition wall 64 defines the flow passage and controls the flow of the cooling liquid inside the cooling liquid chamber 46. This allows the cooling liquid to cool the oil effectively.

(5) The first motor-generator MG1 and the second motor-generator MG2 are cooled by the oil that is cooled by the cooling liquid, which cools the electronic component 40.

(6) Gears, such as the differential gear 34, and bearings are cooled, or lubricated by the oil that is cooled by the cooling liquid, which cools the electronic component 40.

(7) The oil stored in the oil catch tank 44 is cooled by the cooling liquid, which cools the electronic component 40.

(8) The inlet 50a and the outlet 50b for the cooling liquid are arranged in the cover 50 and not in the transaxle case 21 defining the inverter chamber 42 and the oil catch tank 44. Thus, the inlet 50a and the outlet 50b for the cooling liquid are easily formed.

Modified Examples

The present embodiment may be modified as follows. The present embodiment and the following modifications can be combined as long as the combined modifications remain technically consistent with each other.

The shape of the cooling liquid chamber 46 may be changed. For example, the cooling liquid chamber 46 may be substantially box-shaped and one of the surfaces may form a wall of the inverter chamber 42 and a wall of the oil catch tank 44.

The partition walls 60, 62, and 64 may be omitted.

The transaxle 20 in the above embodiment includes the oil catch tank 44 that captures some of the oil dispersed when the differential gear 34 is driven. However, this is merely an example. The transaxle 20 only needs to include an oil chamber configured to store the oil serving as a refrigerant.

The structure of the transaxle 20 may be changed. In the above embodiment, the transaxle 20 includes the first motor-generator MG1 and the second motor-generator MG2. Instead, the transaxle 20 may include only one motor.

In the above embodiment, the transaxle case 21 is a single component. However, this is merely an example. The transaxle case 21 may include a part forming the inverter chamber 42 that is separate from a part forming the motor chamber 52.

In the above embodiment, the oil that lubricates the differential gear 34 and the like is used to cool the first motor-generator MG1 and the second motor-generator MG2. However, this is merely an example. The oil that lubricates the differential gear 34 and the like may differ from the oil that cools the first motor-generator MG1 and the second motor-generator MG2.

In the above embodiment, the transaxle 20 is installed in the electric vehicle including the engine 10. Specifically, the transaxle 20 is installed in a hybrid electric vehicle (HEV). However, this is merely an example. The transaxle 20 may be applied to a plug-in hybrid electric vehicle (PHEV). Further, the transaxle 20 may be applied to a battery electric vehicle (BEV), or a pure electric vehicle (EV) that omits the engine 10. In the above embodiment, some of the oil dispersed by driving of the differential gear 34 is captured by the oil catch tank 44 that is open in the gear chamber 48. Then, the oil is cooled in the oil catch tank 44 adjacent to the cooling liquid chamber 46. When the transaxle 20 is applied to a BEV, an oil chamber may be arranged instead of the oil catch tank 44, and the oil pump 54 may guide the oil into the oil chamber. The oil flowing into the oil chamber may be cooled by the cooling liquid, which flows through the cooling liquid chamber 46 adjacent to the oil chamber. Furthermore, the transaxle 20 may be applied to a fuel cell electric vehicle (FCEV) and the like.

In the above embodiment, the cooling liquid flowing through the cooling liquid chamber 46 is a coolant. However, this is merely an example. The cooling liquid flowing through the cooling liquid chamber 46 may be oil.

The electronic component 40 may include, for example, a power card. A power card is a main component of a power control unit and is inserted in a cooler stack. The power card includes a power semiconductor element and a heat dissipation plate soldered on each surface of the power semiconductor element. The power card dissipates the heat produced by the power semiconductor element effectively. Accordingly, the power card is increased in electric power capacity and reduced in size.

In the above embodiment, the inlet 50a and the outlet 50b for the cooling liquid are arranged in the cover 50. However, this is merely an example. The inlet 50a and the outlet 50b for the cooling liquid may be arranged in the transaxle case 21.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A transaxle for an electric vehicle, the transaxle comprising:
a motor;
an inverter chamber accommodating an electronic component configured to control the motor;
an oil chamber configured to store an oil that serves as a refrigerant; and
a cooling liquid chamber through which a cooling liquid that cools the electronic component flows, wherein
the inverter chamber includes a wall also serving as a wall of the cooling liquid chamber, the oil chamber includes a wall also serving as a wall of the cooling liquid chamber, the cooling liquid chamber includes a first liquid chamber extending between the inverter chamber and the oil chamber, the first liquid chamber includes a partition wall that partitions the first liquid chamber into a first flow passage and a second flow passage, the second flow passage extending back from a portion connected to the first flow passage so that the cooling liquid flows in a direction opposite to a horizontal direction perpendicular to a shaft of the motor in which the cooling liquid flows in the first flow passage, and the first flow passage and the second flow passage are both located adjacent to the inverter chamber at a side of the wall separating the inverter chamber and the cooling liquid chamber, opposite to the inverter chamber.

2. The transaxle according to claim 1, wherein
the cooling liquid chamber includes a second liquid chamber adjacent to the oil chamber, the second liquid chamber includes a partition wall that partitions the second liquid chamber into a third flow passage and a fourth flow passage, the fourth flow passage extending back from a portion connected to the third flow passage so that the cooling liquid flows in a direction opposite to a direction in which the cooling liquid flows in the third flow passage, and the third flow passage and the fourth flow passage are both located adjacent to the oil chamber at a side of the wall separating the oil chamber and the cooling liquid chamber, opposite to the oil chamber.

3. The transaxle according to claim 1, comprising:
an oil pump configured to pump the oil; and
an oil shower configured to shower the oil pumped by the oil pump on the motor.

4. The transaxle according to claim 1, comprising:
a gear directly or indirectly connected to the motor,
wherein the gear is at least partially immersed in the oil.

5. The transaxle according to claim 1, comprising:
a gear directly or indirectly connected to the motor, wherein
the gear is lubricated by the oil, and
the oil chamber is an oil catch tank configured to store the oil dispersed when the gear is rotated.

6. The transaxle according to claim 1, wherein
the cooling liquid chamber is defined by a transaxle case, forming the inverter chamber and the oil chamber, and a cover, coupled to the transaxle case and forming a wall of the cooling liquid chamber, and the cover includes an inlet and an outlet for the cooling liquid.

* * * * *